Figure 1:
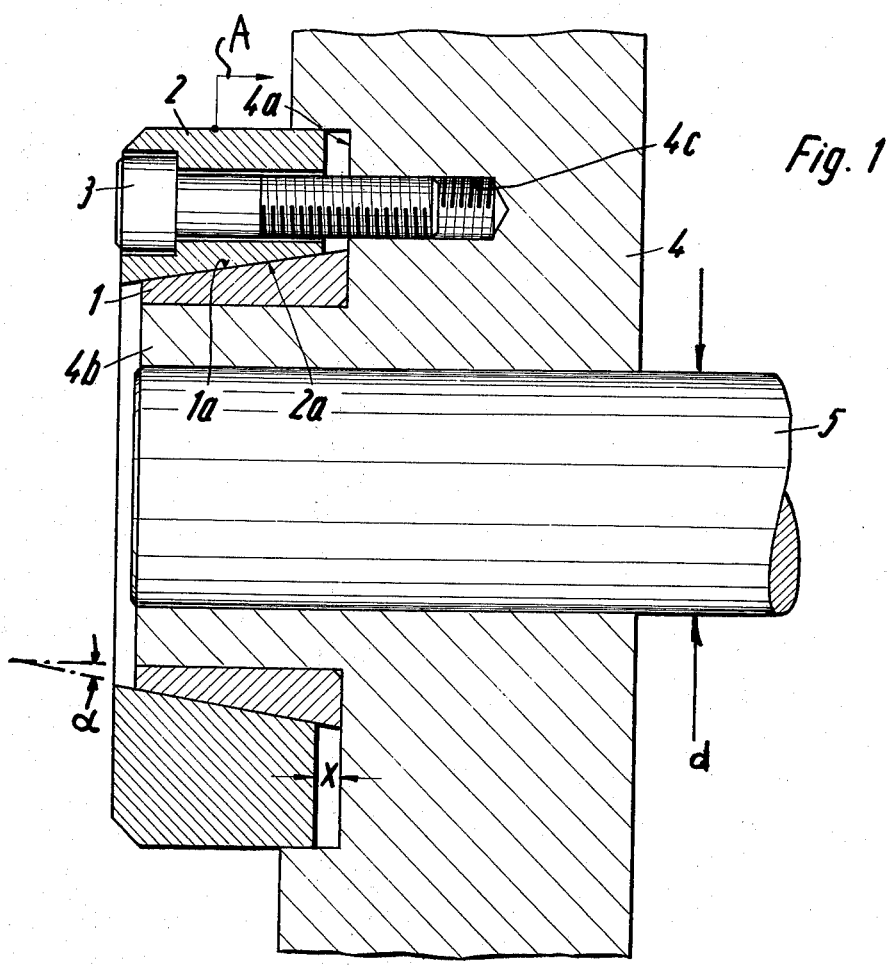

United States Patent
Peter et al.

[11] 3,972,636
[45] Aug. 3, 1976

[54] HUB-TO-SHAFT COUPLING

[75] Inventors: Oskar Erich Peter, Brackenheim; Lothar Peter, Guglingen, both of Germany

[73] Assignee: Oskar Erich Peter, Brackenheim, Germany

[22] Filed: July 3, 1975

[21] Appl. No.: 592,922

[30] Foreign Application Priority Data
Aug. 29, 1974 Germany............................ 2441400

[52] U.S. Cl................................ 403/374; 403/370
[51] Int. Cl.²........................................ B60B 27/06
[58] Field of Search ............ 403/370, 374, 371, 369

[56] References Cited
UNITED STATES PATENTS

| | | | |
|---|---|---|---|
| 2,755,093 | 7/1956 | Peter et al. | 403/369 X |
| 3,165,342 | 1/1965 | Anderson | 403/374 |
| 3,656,785 | 4/1972 | Lothar | 403/371 X |
| 3,782,841 | 1/1974 | Winckelhaus | 403/370 X |

*Primary Examiner*—Andrew V. Kundrat
*Attorney, Agent, or Firm*—Flynn and Frishauf

[57] ABSTRACT

To couple a hub having a connecting boss to a shaft, with improved centricity and torque transmission, the hub is formed with a ring groove in the end face leaving a protruding boss surrounding the shaft, in which ring groove a pair of concentric rings having matching continuous conical surfaces are inserted, the depth of the ring groove, and the rings themselves being so relatively dimensioned that, in loosely assembled condition, the inner surface of the outer ring is spaced from the axially facing surface of the ring groove by a pretermined distance which is taken up during tightening, the inner face of the ring groove then forming a stop or abutment surface upon such axial tightening of the outer ring over the inner ring to completely fill the ring groove and provide for radial support of the hub in the region of the ring groove as well as for transfer of power from the shaft to the hub by engagement of the boss of the hub with the shaft, and of the rings with each other and with the hub, respectively.

3 Claims, 2 Drawing Figures

HUB-TO-SHAFT COUPLING

Cross reference to related patents:
3,656,785
3,717,367
3,679,247
3,776,651
3,847,493
3,847,495
assigned to the assignee or inventor, respectively, of the present application.

The present invention relates to a hub-to-shaft coupling in which a hub having a boss thereon is slipped directly over a shaft, and a coupling element is used to clamp the boss of the hub on the shaft.

Coupling elements of the type to which the invention relates have previously been proposed — see German Pat. No. DT-PS 1,294,751. Such a coupling uses a clamping ring with oppositely directed conical surfaces surrounding a cylindrical boss which, in turn, surrounds the shaft on which the boss of the hub is to be clamped. The clamping ring with the two oppositely directed conical surfaces cooperates with a pair of clamp rings having corresponding conical surfaces, the clamping ring and the clamp rings being engaged and clamped together by means of axially directed screws, located in planetary arrangement around the shaft. It has been found that manufacture of the oppositely directed conical surfaces of the clamping ring and the conical surfaces of the two clamp rings is expensive and time-consuming, particularly since four conical surfaces have to be formed which cooperate, and which carry by transfer of forces from one to the other the axial loading upon clamping, resulting in radial pressure of the boss on the shaft. To obtain approximately uniform radial pressure of the boss on the shaft, and hence to load the shaft uniformly for transfer of maximum torque, the conical surfaces have to be matched accurately. Additionally, the clamping ring and the clamp rings have to be tightened to predetermined stresses; this is obtained by tightening the clamping bolts by means of a torque wrench to predetermined torque values, corresponding to design stresses and limited largely only by the strength of the materials of which the bolts are made. The resulting axial forces being transmitted on the conical surfaces then provide the necessary compression to the engaging surfaces of the conical clamping ring and of the clamp rings, which transfer torque by frictional engagement. It is a requirement, however, that the bolts are uniformly tightened to design pressure in order to ensure reliability of the coupling, in operation, and particularly under dynamic loading.

It has been found in actual experience that in many installations the tightening of the bolts is carried out improperly. Many establishments do not have the proper torque wrenches of the proper ranges, so that frequently the clamping bolts are tightened by mechanics in accordance with "feel". This is a substantial problem, particularly when couplings of this type are delivered to areas having different measuring systems or machining customs; improper tightening interferes, however, with reliability of operation of the coupling.

Some of the known couplings provide for a rigid, tight connection of the element of which the hub forms a part — such as gears, drive drums, drive sheaves, flywheels, or the like; the inner side of the coupling does not provide for elastic support so that bending stresses which may arise in addition to the torque moments to be transmitted by the shaft to the coupled element will overstress the shaft; upon frequent overloading, particularly under dynamic condition, the shaft or the hub will fail; this problem is particularly serious in hubs of large diameter used in heavy machinery.

It is an object of the present invention to provide a hub-to-shaft coupling in which the disadvantages of the prior art are essentially eliminated, the transmitted torque is increased and the coupling can be easily assembled without the use of torque wrenches, or other special tools, while still obtaining at all times transfer of power in accordance with design values.

SUBJECT MATTER OF THE PRESENT INVENTION

Briefly, an inner coupling ring is provided having only a single conical surface; this coupling ring cooperates with a thick-walled outer coupling ring having a single corresponding conical surface, the outer coupling ring being radially moved by clamping bolts. When the two coupling rings are assembled, and in loosely placed arrangement (for example with the bolts being "hand-tight"), the coupling rings and the groove formed in the end face of the hub — beneath which the shaft gripping boss is defined — are so arranged and designed that a certain distance will remain between the face of the groove and the inner end of at least one of the coupling rings. To tighten the coupling, it is then only necessary to tighten the clamping bolts so that the inner face of the coupling ring will engage the end of the groove. When the coupling ring and the groove are in engagement, that is, when the inner face of the hub, which defines the groove, forms a stop or abutment for the coupling ring, the assembly will be tight and the design torque can be transmitted from shaft to hub. Additionally, the groove is entirely filled with the material of the two coupling rings, thus providing for axial transfer of weight of the hub and the associated rotating element.

The coupling, in accordance with the present invention, reduces the required machining steps in which conical surfaces are to be made — hence reduces the expensive part of manufacture. The coupling is simple and can be made inexpensively, since the inner coupling ring, or the outer coupling ring, respectively, are formed with only a single conical surface, of the same cone angle. The thick-walled outer clamping ring having the conical bore corresponding to the conical shape of the inner ring will, when tightly clamped, engage the corresponding inner ring throughout its entire axial length and transfer forces in radial direction to permit transfer of high torques, even under rapidly changing sudden acceleration or deceleration forces, that is, under extreme dynamic loading. Operating reliability is improved and the torque transmission increased, in accordance with the present invention, in that the coupling provides for radial support and clamping by the outer coupling ring, so that the hub is supported radially throughout its entire axial extent. The coupling forms a complete fixed unitary assembly without loose parts which can be lost; bending moments transmitted by the hub to the shaft are first transmitted over the coupling which, due to the frictional surface engagement, has a certain resiliency or elasticity, so that bending moments are attenuated or absorbed by the coupling before being transferred to the shaft where they cause damage.

Matching the axial extent and shape of the elements of the coupling in accordance with the present invention to the ring groove in the end face of the hub to provide for a predetermined distance results in self-alignment of the elements of the coupling and, when tightened, a fixed predetermined degree of tightening, or tightening force requirements, without use of a torque wrench or the like. The clamping bolts themselves are relieved of some stress when the clamping ring is tightened against the inner surface of the groove and, upon such engagement, transfer of design torque will always be possible. The bolts will be uniformly stressed and variations in accuracy of indication of torque wrenches, or differences in "feel" of different mechanics are eliminated. Thus, random variations in tightness, circumferentially, are avoided. In accordance with a feature of the invention, the tightening distance and the dimensions of the coupling rings are calculated and made with close tolerances in order to prevent variations from design values which might interfere with proper torque transmission. Variations in axial loading on the bolts are effectively eliminated, thus also eliminating chambers in radial pressure against the boss on the hub, and against the shaft, and non-uniformities of force transmisson to the shaft, and hence variations in torque transfer from design values. By suitable choice of materials of the clamping rings, of the bolts, of the cone angles and surfaces, it is possible to match the coupling to required transmitted torques within the limits of available material. Any stresses which might induce fissures, or failure due to notch effect of the end portions of the shaft, are effectively avoided by the coupling, since the conical surface of the inner ring rises from a minimum to a maximum value, starting at the end face of the shaft towards an intermediate portion thereof, thus increasing the strength of the coupling, as well as reliability of operation of the shaft and the hub-shaft combination.

If the hub has sufficient width, the coupling can be located entirely within the outline of the hub, so that the boss of the hub seating on the shaft will be flush with the end face of the hub, without a projecting drum; particularly in large installations this is a desirable construction since it provides for a smooth, flush outer surface not presenting projecting rotating parts which might cause industrial accidents.

The conical surfaces themselves may be formed to have a self-binding angle, as well as non-self-binding angles. If the coupling is selected to have self-binding angles, then the coupling ring through which the bolts pass should be supplied with additional tapped bores in which the bolts can be inserted after having been removed from coupling engagement with the hub, to serve as press-off bolts to release the coupling, similar to the release of a coupling with self-binding conical surfaces as disclosed in U.S. Pat. No. 3,656,785, assigned to the assignee of the present application.

Figure 2:
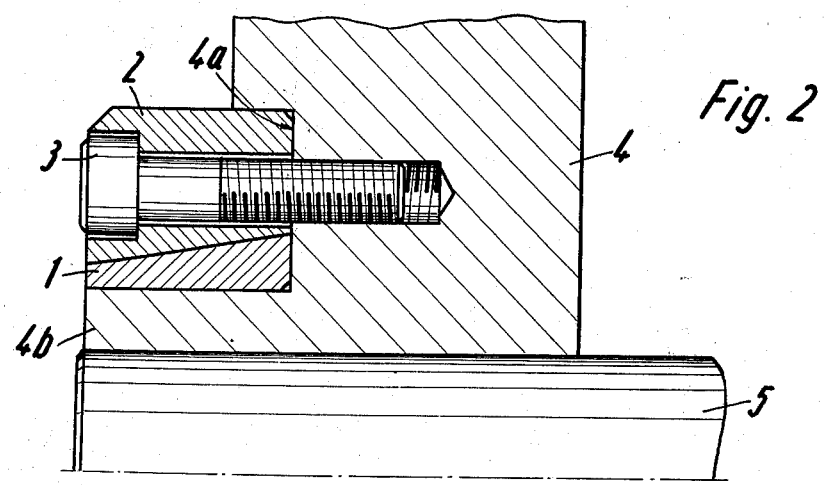

The invention will be described by way of example with reference to the accompanying drawings, wherein:

FIG. 1 is a schematic axial cross-sectional view through a coupling in accordance with the present invention to secure a hub with an end ring groove on a shaft, and illustrating the coupling before tightening; and FIG. 2 is a fragmentary view similar to FIG. 1 illustrating the upper portion of the coupling in tightened condition.

The hub 4 is formed with a facing ring groove 4a beneath which a boss 4b is defined. The hub 4, with the boss 4b, seats on a shaft 5. A continuous, closed inner coupling compression ring 1, having an outer conical surface 1a, is fitted into the ring groove. An outer conical ring 2, of substantially thicker cross section that the inner ring 1 and having a matching conical surface 2a, is fitted over the inner ring 1. The cone angle is indicated at $\alpha$, and the diameter of the shaft 5 at $d$. Bolts 3 extend through the outer ring 2 into tapped holes 4c formed in the hub 4. When loosely assembled, for example when assembled to be "hand-tight", the inner face of the outer ring 2 is spaced from the end face of the groove 4a by a distance $x$. Upon tightening of bolts 3 into the tapped bores 4c, outer ring 3 is moved inwardly in the direction of the arrow A (FIG. 1) until the position of the outer ring will be that shown in FIG. 2, namely with the end face of the outer ring fitting against the end face of the groove 4a, so that the rings 1, 2 will entirely fill the ring groove 4a. The distance $x$ is selected in accordance with material characteristics and strength of the bolts 3, the surface conditions and materials of the rings 1, 2, in the light of the torque to which it is desired to transmit.

Assembly, use and operation: The bores 4c, to receive the holes 3, are located around the central shaft opening to receive shaft 5 in planetary arrangement. The outer coupling ring 2 is first made and bored to receive bolts 3, and then inserted into the hub, so that ring 2 may serve as a jig for the boring and tapping operation of the holes 4c. Upon insertion of bolts 3 formed, for example, with an Allen head, and upon tightening of the bolts 3, outer ring 2 will move in direction of the arrow A with its conical bore over the conical surface 1a of the inner ring 1 to completely fill the ring groove 4a of the hub 4. At the terminal position, the end faces of the outer clamping ring 2 and of the ring groove 4a will fit against each other, so that the exposed face of the groove 4a will form a stop or abutment. This movement corresponds to the distance $x$ which, in the drawing, is shown highly exaggerated with respect to the remaining relative dimensions. Tightening can be carried out with an ordinary Allen head wrench, and without requiring a torque wrench. The inner clamping ring 1 is clamped with resulting radial pressure on the boss 4b and thus on shaft 5; the thick-walled outer clamping ring 2 is clamped with resulting radial pressure on the cylindrical outer surface of the hub formed by the ring groove 4a and additionally engages the conical surface 1a. The axial displacement is that corresponding to dimension $x$, and, when tightened, the coupling will transmit torques at a desired design value.

To release the coupling, the bolts 3 are loosened to the position shown in FIG. 1. If the cone angle $\alpha$ is non-self-binding, the outer ring can then be removed easily. If the cone angle $\alpha$ is self-binding, additional press-off bores are formed in the outer ring 2, and some of the bolts 3 are removed entirely from the bores 4c and, rather, inserted in the press-off bores to pull off the outer ring 2, so that the inner ring 1 can then be readily removed.

In one example, the shaft diameter $d$ was: 2.000 inches A suitable angle $\alpha$ for a self-binding coupling is 3° – 5°. A suitable angle α for a non-self-binding coupling is: 6° – 8°.

Various changes and modifications may be made within the scope of the inventive concept. Specifically, the relationship of the rings 1, 2 can be reversed, in that the thicker ring can be constructed as the inner, and the thinner ring as the outer one, with the cone angles likewise reversed. Since this places the bolts at a closer diametric location to the shaft, however, the arrangement illustrated in FIG. 1 is preferred.

We claim:

1. Hub-to-shaft coupling in which the hub (4) has a central shaft bore and a ring groove (4a) formed in the face thereof concentric with the shaft and leaving a boss (4b) between the ring groove and the shaft bore in the hub;

and a clamping ring assembly comprising concentric rings (1, 2) having respective matching conical surfaces, said clamping ring assembly fitting in said ring groove (4a) and clamping bolts (3) extending axially into the hub to tighten said concentric conical engaging rings against each other, characterized in that the inner one (1) of the concentric rings has only one continuous conical outer surface (1a) which is stressed in compression by the conical surface of the outer ring (2a), the outer ring (2) having greater radial thickness than the inner one, the radial depth of the ring groove (4a) and its axial extent in relation to the combined radial thickness of the concentric rings and their axial extent is such, and the conical surfaces are so related and matched to each other that, in loosely assembled condition, the inner end surface of the outer ring (2) is spaced from the axially facing surface of the ring groove (4a) by a predetermined distance ($x$), and said axially facing surface of the ring groove (4a) forms a stop or abutment for both rings upon final axial tightening of the outer ring (2) over the inner ring (1) upon tensioning of said bolts (3), and assures filling the entire ring groove and provide for radial support of the hub in the region of the ring groove as well as for transfer of torque from the shaft to the hub by engagement of the boss of the hub with the shaft, and the rings with each other and with the hub, respectively, the distance ($x$) being further matched to the material strength of the bolts and of the rings to provide a predetermined clamping pressure of the rings against each other and hence of the hub and the boss on the shaft.

2. Coupling according to claim 1, wherein the cone angles of the concentric rings are self-binding.

3. Coupling according to claim 1, wherein the cone angles of the concentric rings are non-self-binding.

* * * * *